(12) United States Patent
Ostermann

(10) Patent No.: US 10,168,098 B2
(45) Date of Patent: Jan. 1, 2019

(54) METHOD FOR DRYING MOIST MATERIAL AND DRYING PLANT

(71) Applicant: HUBER SE, Berching (DE)

(72) Inventor: Stefan Ostermann, Postbauer-Heng (DE)

(73) Assignee: HUBER SE, Berching (DE)

(*) Notice: Subject to any disclaimer, the term of this patent is extended or adjusted under 35 U.S.C. 154(b) by 311 days.

(21) Appl. No.: 15/131,255

(22) Filed: Apr. 18, 2016

(65) Prior Publication Data

US 2016/0313060 A1 Oct. 27, 2016

(30) Foreign Application Priority Data

Apr. 21, 2015 (DE) .................. 10 2015 106 120

(51) Int. Cl.
| | |
|---|---|
| *F26B 25/22* | (2006.01) |
| *C02F 1/00* | (2006.01) |
| *C02F 11/12* | (2006.01) |
| *F26B 3/04* | (2006.01) |
| *F26B 17/04* | (2006.01) |
| *F26B 25/00* | (2006.01) |

(52) U.S. Cl.
CPC .............. *F26B 25/22* (2013.01); *C02F 1/008* (2013.01); *C02F 11/12* (2013.01); *F26B 3/04* (2013.01); *F26B 17/04* (2013.01); *F26B 25/001* (2013.01); *F26B 25/002* (2013.01); *C02F 2209/001* (2013.01); *F26B 2200/18* (2013.01)

(58) Field of Classification Search
CPC .. F26B 25/22; F26B 3/04; F26B 17/04; F26B 25/001; F26B 21/08; F26B 2200/18; C02F 2209/001; C02F 1/008

USPC .......................................................... 34/382
See application file for complete search history.

(56) References Cited

U.S. PATENT DOCUMENTS

| | | | |
|---|---|---|---|
| 4,380,496 | A | 4/1983 | Maffet |
| 4,389,476 | A | 6/1983 | Whalen-Shaw et al. |

(Continued)

FOREIGN PATENT DOCUMENTS

| | | |
|---|---|---|
| DE | 3231004 | 2/1984 |
| DE | 202009001935 U1 | 7/2009 |

(Continued)

OTHER PUBLICATIONS

Search Report dated Nov. 27, 2015 for German Patent Application No. 10 2015 106 120.1.

(Continued)

*Primary Examiner* — Stephen M Gravini
(74) *Attorney, Agent, or Firm* — JK Intellectual Property Law, PA

(57) ABSTRACT

A method for drying moist material includes supplying the moist material to a feeding unit of a drying plant through a supply pipe; depositing the moist material on a drying surface, while, based on a parameter that depends on the water content of the moist material passing by a sensor at least one of the supply pipe and the feeding unit, continuously regulating a quantity of the moist material being deposited on the drying surface per unit of time; and drying the moist material on the drying surface. A related drying plant dries moist material using a sensor for sensing a parameter of the moist material supplied and varying a quantity of the moist material being deposited on the drying surface per unit of time.

11 Claims, 1 Drawing Sheet

(56) References Cited

U.S. PATENT DOCUMENTS

| | | | |
|---|---|---|---|
| 4,398,476 A | 8/1983 | Suzuki et al. | |
| 4,555,858 A | 12/1985 | Hegedus et al. | |
| 5,079,852 A | 1/1992 | Nakayama et al. | |
| 5,619,806 A * | 4/1997 | Warren | D21F 5/005 162/290 |
| 6,035,546 A * | 3/2000 | Stricker | B01J 8/10 34/147 |
| 6,101,739 A * | 8/2000 | Rutz | B01D 53/34 34/373 |
| 6,125,549 A * | 10/2000 | Pikus | F26B 3/205 34/135 |
| 6,233,841 B1 * | 5/2001 | Beach | A23L 3/54 34/203 |
| 7,028,414 B2 | 4/2006 | Vonplon | |
| 8,225,458 B1 * | 7/2012 | Hoffberg | E05F 3/102 16/49 |
| 8,464,437 B1 * | 6/2013 | Weisselberg | F26B 17/003 110/219 |
| 8,726,532 B2 * | 5/2014 | Hogan | F26B 17/103 15/345 |
| 8,832,962 B2 * | 9/2014 | Pardo | F26B 23/002 110/224 |
| 9,366,477 B2 * | 6/2016 | Bux | C02F 11/16 |
| 9,890,344 B2 * | 2/2018 | Kim | C10L 9/00 |
| 9,939,198 B2 * | 4/2018 | Hoffman, Jr. | F26B 15/18 |
| 2013/0333236 A1 | 12/2013 | Grosser | |
| 2016/0313060 A1 * | 10/2016 | Ostermann | F26B 3/04 |

FOREIGN PATENT DOCUMENTS

| | | | |
|---|---|---|---|
| DE | 202009004860 U1 | 12/2009 | |
| DE | 102009051224 | 7/2011 | |
| DE | 202012012605 | 10/2013 | |
| DE | 102015106120 A1 * | 10/2016 | F26B 3/04 |
| EP | 1854767 | 11/2007 | |
| EP | 3085671 A1 * | 10/2016 | F26B 3/04 |
| EP | 3109002 A1 * | 12/2016 | F26B 3/04 |
| JP | S55147115 | 11/1980 | |
| JP | S643450 | 2/1989 | |
| JP | H04338300 | 11/1992 | |
| JP | H0957296 | 3/1997 | |
| JP | 2008221060 | 9/2008 | |

OTHER PUBLICATIONS

Search Report dated Jun. 27, 2016 for European Patent Application No. 16165469.4-1371.

* cited by examiner

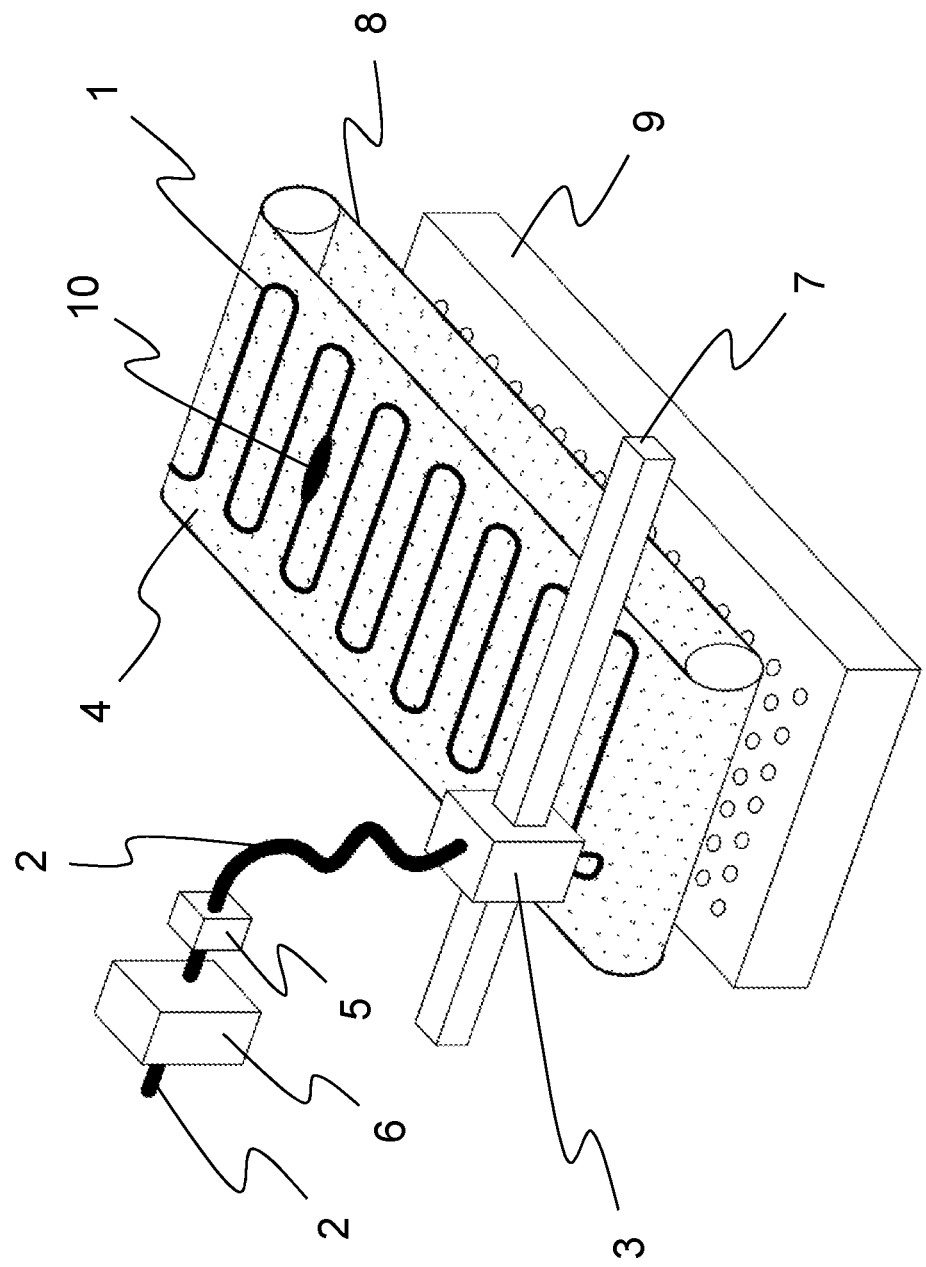

METHOD FOR DRYING MOIST MATERIAL AND DRYING PLANT

CROSS-REFERENCE TO RELATED APPLICATIONS

This application claims benefit to German Patent Application No. 10 2015 106 120.1, filed Apr. 21, 2015 and incorporated by reference herein.

TECHNICAL FIELD

The present invention refers to a method for drying moist material, especially in form of sludge, with the help of a drying plant, whereby the moist material is supplied to the drying plant through a supply pipe of a feeding unit of the drying plant and, with the help of the feeding unit, deposited on a drying surface of the drying plant to be dried there.

Furthermore, a drying plant for drying moist material, especially in form of sludge, is suggested, whereby the drying plant has at least one drying surface to receive the moist material while it dries, whereby the drying plant has at least one feeding unit with whose help the moist material can be deposited on the drying surface while the drying plant is being operated, and whereby the drying plant comprises at least one supply pipe through which the moist material to be dried can be supplied to the feeding unit.

BACKGROUND

So that moist material such as sludge, for example, can be dried for further utilization (e.g. its incineration), it has been the state of the art for quite a while to deposit moist material on a drying surface and remove the water contained in it with the help of corresponding heating devices.

It is furthermore known that the drying power of the respective plant or the height or mass flow of the moist material to be deposited on the drying surface can be selected depending on the water content of the moist material to be fed into the drying plant or on the water content of the moist material that is already on various places of the drying surface (see, for example, DE 10 2011 004 788 A1).

Even though the above-mentioned methods already dry the moist material relatively well, there is nonetheless a certain room for improvement regarding the energy efficiency of the drying plant and the homogeneity of the dried moist material.

SUMMARY

The task of the present invention is therefore to suggest an improved method for drying moist material compared to the state of the art and a suitable drying plant to implement the method.

The task is solved by a method and a drying plant that have the characteristics of the present disclosure.

According to the invention, a method for drying moist material with the help of a drying plant is suggested at first. Within the framework of the invention, the term "moist material" is understood to be a material having a certain proportion of solids in addition to certain water content. A typical example of such material is the sludge (i.e. mud) produced during sewage treatment.

The method according to the invention foresees the moist material to be supplied to the drying plant through a supply pipe of a feeding unit, to be deposited on a drying surface of the drying plant with the help of the feeding unit and to be dried until the desired residual water content is obtained. The supply pipe is preferably a piping system consisting of rigid and/or flexible pipe sections through which the moist material is taken from a moist material storage tank or another moist material collection point while the drying plant is operating so it can be fed to the feeding unit. Finally, the feeding unit connected to the supply pipe serves to deposit the moist material coming through the supply pipe on the drying surface. The feeding unit can be a tail piece with an opening at the end of the supply pipe, through which the moist material can be deposited. However, it is also conceivable for the feeding unit to apportion the moist material available in the supply pipe as continuous string. For example, the feeding unit can be executed as an extruder with one or more openings through which the moist material must pass, and a cutting unit that can be moved relative to the openings to cut the moist material string into many pellet-shaped individual units that finally fall on the drying surface beside or on top of one another.

The drying surface is preferably a circulating drying belt powered by a drive through which a heated air current flows, for example, to dry the moist material (the drying belt is preferably perforated to achieve this). In this case, the drying plant is executed as belt dryer.

The aim of the method is to dry the moist material deposited on the drying surface in such a way that the final moisture (i.e. the residual water content) of the dried moist material lies within certain (as much as possible, narrow) limits so a selective further utilization of the dried moist material is made possible. Furthermore, the drying capacity of the drying plant during the drying process should remain as constant as possible and lie within a level that utilizes the maximum effectiveness of the drying plant.

To ensure this, the invention suggests monitoring a parameter (in the supply pipe and/or feeding unit area) with the help of a sensor that depends on the water content of the moist material passing the sensor while the moist material is being deposited on the drying surface. The parameter can be the water content of the moist material or also the measurement signal of a sensor that directly or indirectly measures the water content of the moist material. Generally, any physically measurable parameter that depends on the water content of the moist material can be used here within the framework of the invention. Moreover, it must be pointed out that the sensor should be located either on the supply pipe or in/on the feeding unit.

In any case, the invention provides for the continuous regulation of the quantity (volume or mass) of the moist material deposited on the drying surface per unit of time with the help of the feeding unit, taking the parameter into account. Thus, during the drying process, the moist material is not constantly being deposited on the drying surface with the same mass or volume flow set at the beginning of the drying process. Rather, the water content is considered in the task and the quantity of the moist material being deposited is selected to be lower as the water content increases, so that the residual water content of the moist material leaving the drying plant is always constant or at least fluctuates only within very narrow limits. Therefore, the drying capacity of the drying plant remains preferably almost constant during the drying process.

Thus, to sum up, the invention provides for the monitoring and regulation of the water content of the moist material to be dried in an area directly before the location in which the moist material comes out of the feeding unit and the quantity of the moist material that leaves, depending on the water content determined immediately before that, i.e. to adjust it constantly or continuously on the water content.

It is also advantageous if the value of the parameter is determined at regular intervals and thus not continuously (whereby the latter case could also be conceivable). For example, it could be conceivable to determine the parameter value between 1 and 100 times an hour and, after measuring the parameter, adjust in each case the quantity of the moist material to be deposited on the drying surface to the measurement result. The adjustment of the quantity of the moist material reaching the drying surface is not continuous in this case, but nonetheless adjusted at regular intervals.

It is also advantageous if the value of the parameter is averaged over the course of a defined time period and the quantity of the moist material being deposited on the drying surface per unit of time with the help of the feeding unit is regulated, taking into account the respective averaged parameters. As a result of this, a change in the quantity being fed (=quantity of moist material that leaves the feeding unit) caused by just a very brief fluctuation of the water content of the moist material passing the sensor can be prevented. Rather, an adjustment of the quantity being fed (which depends on the corresponding mean values based on several parameter measurements that were thus obtained), based on the water content of various sections of the moist material, takes place. As a result of this, the number of changes of the feeding quantity can be minimized.

It is also extremely advantageous if a change in the quantity of moist material deposited on the drying surface per unit time takes place only when the parameter value changes by at least a certain minimum value within a defined time period or deviates from a set reference value by a certain minimum value. In this case, a change in water content of the moist material passing the sensor does not necessarily causes a change in the deposited quantity. Rather, the change takes place only when certain limits are exceeded or not reached or there is a defined, time-related change of the water content of the moist material passing the sensor.

It is likewise advantageous if the moist material is moved through the supply pipe towards the feeding unit with the help of a conveyor, preferably with the help of a pump, in which case the conveying performance of the conveyor is regulated taking the above-mentioned parameter into account. For example, when drying sludge, it could be conceivable to use a thick matter pump and to regulate its speed depending on the water content of the moist material passing the sensor. In the likewise possible use of a conveyor worm, its speed would vary accordingly.

There are additional advantages if the parameter is determined without making contact. In this case, the sensor does not make direct contact with the moist material, thereby ruling out a contamination of the sensor or damage to it caused by the moist material. For example, the sensor could be executed as microwave sensor (another name: microwave resonator). Here, the sensor would be integrated into the conveyor pipeline in such a way that the moist material would pass by the resonator space of the microwave sensor. Depending on the water content, the resonance signal of the microwave sensor changes during the measurement, so that this parameter finally allows one to make conclusions about the water content of the moist material passing the sensor and, in the end, to allow the regulation of the quantity being supplied by the feeding unit. Incidentally, the sensor (seen in conveying direction of the moist material) is preferably arranged between the conveyor and the feeding unit.

It is especially advantageous if the quantity of moist material being deposited on the drying surface per unit of time is regulated taking the current drying capacity and/or additional characteristic values of the drying plant into account. In other words, when the quantity supplied by the feeding unit is regulated, parameters specific to the drying plant should also be considered. For example, with otherwise constant characteristic values or parameters, the feeding quantity can be selected to be higher when the drying plant has a higher drying capacity than when its drying capacity is lower.

However, apart from the feeding quantity, it is also likewise conceivable to regulate other values of the drying plant or drying process that depend on the water content of the moist material passing through the sensor. Thus, it could be possible to change the capacity of an extruder executed as part of the feeding unit when the water content of the moist material passing by the sensor changes. For example, the feeding unit could comprise an extruder with a pelletization device for pelleting (i.e. fragmenting) the moist material, whereby the pelletization device would be operated taking the parameter into account and its parameter changed depending on the water content of the moist material passing through the sensor.

Furthermore, the invention refers to a drying plant for drying moist material, especially in form of sludge, whereby the drying plant has at least one drying surface to receive the moist material while it dries, whereby the drying plant has at least one feeding unit with whose help the moist material is deposited on the drying surface while the drying plant is being operated and whereby the drying plant comprises at least one supply pipe through which the moist material to be dried can be supplied to the feeding unit. With regard to possible physical characteristics of the drying plant or its components, reference is made first of all to the description given above and to the one below, although all characteristics can be realized individually or in any combination as long as this does not lead to technical contradictions.

In any case, the drying plant (executed preferably as belt dryer) comprises at least one sensor arranged in the supply pipe or feeding unit area used to measure a parameter that depends on the moist materials passing through the sensor. Moreover, the drying plant has a device with which the quantity (i.e. the mass or volume flow) of moist material deposited on the drying surface with the help of the feeding unit while the drying plant is being operated can be regulated continuously, taking the parameter into account. The device can be, for example, a valve arranged around the supply pipe used to regulate the maximum moist material throughput of the supply pipe.

In an especially preferred design of the invention, the above-mentioned device comprises a conveyor with whose help the moist material is supplied to the feeding unit through the supply pipe while the drying plant is in operation. Furthermore, the device comprises a control unit executed to regulate the conveying capacity of the conveyor while considering the parameter determined with the help of the sensor.

In this context, it is additionally advantageous if the conveyor is executed as a pump (e.g. as thick matter or sludge pump). Here, the control unit evaluates the sensor's measured values and compares them with the reference values stored accordingly in the control unit. Depending on the deviation from the current measured value (or an average of several measured values), the control finally changes the pump's conveying capacity to consequently adjust the quantity of moist material being deposited to the water content of the moist material passing by the sensor which is thus about to be delivered.

It is furthermore advantageous if the sensor is designed so it can determine the parameter without making contact. For example, the sensor can be executed as an optical or capacitive sensor or one that works based on microwave resonance and located, for example, behind a transparent or non-transparent wall of the conveying pipeline or discharge unit, so that the sensor itself does not make direct contact with the moist material.

BRIEF DESCRIPTION OF THE DRAWINGS

Further advantages of the invention are described in the following embodiment drawing, which shows schematically:

FIG. 1 is a perspective view of a drying plant according to the invention.

DETAILED DESCRIPTION

The only FIGURE shows a perspective view of a drying plant for moist material 1 (especially sludge) as an embodiment of a drying plant according to the invention, with which incidentally the method according to the invention can also be implemented.

The drying plant comprises a drying surface 4 formed by a continuously powered drying belt 8, whereby the drying belt 8 has been executed with perforations in this example to allow drying air to pass, which is in turn blown by a heating arrangement 9 installed below the drying surface 4, for example.

Apart from that, the drying plant has a feeding unit 3 along a guide 7 that can be moved back and forth with the help of a drive (not shown) used to supply the moist material 1 to be dried to the feeding unit 3 through a supply pipe 2 executed in a partially flexible way with the help of a pump 6, so it can be deposited in a controlled way on the drying surface 4.

The feeding unit 3 comprises, for example, an extruder unit with a matrix and a measuring unit that can be moved relative to the matrix, with whose help the moist material 1 pressed through the matrix is broken up into individual pellet-shaped moist material units.

Needless to say, the moist material 1 can also come out of the feeding unit 3 as a strand (see FIGURE) without having to be pelletized here. In this case, the feeding unit 3 is not equipped with a measuring unit.

Now, to ensure that the moist material 1 is dried to a uniform drying level regardless of its water content, the drying plant provides a sensor 5 to the supply pipe 2 or feeding unit 3 with which the water content of the moist material 1 can be determined right before it is deposited on the drying surface 4. Furthermore, a control unit is provided (not shown), functioning to regulate the conveying capacity of the pump 6 depending on the water content of the moist material 1 passing by the sensor 5. Thus, in the final analysis, the quantity of moist material 1 being fed depends on the water content determined. Thus, supply is lowered when the water content is higher but can be increased when the water content is lower.

By way of an example, a thick spot 10, formed when the sensor 5 temporarily detected lower water content and correspondingly increased the supply capacity in the short term is shown in the FIGURE.

The present invention is not restricted to the embodiments shown and described. Variations within the framework of the patent claims are just as possible as any combination of the characteristics described, even if they are shown and described in different sections of the description or the claims or in different embodiments.

The invention claimed is:

1. A method for drying moist material with a drying plant, the method comprising the steps of:
   supplying the moist material to a feeding unit of the drying plant through a supply pipe of the drying plant;
   depositing the moist material on a drying surface of the drying plant using the feeding unit;
   sensing a value of a parameter that depends on a water content of the moist material passing by a sensor proximate at least one of the supply pipe and the feeding unit;
   regulating a quantity of the moist material being deposited on the drying surface per unit of time only when the value of the parameter sensed in the sensing step changes by at least a minimum amount, the minimum amount being one of a first difference between the value sensed in the sensing step and a reference value in a defined period of time or a second difference between the value sensed in the sensing step and a specific minimum value; and
   drying the moist material on the drying surface.

2. A method according to claim 1, wherein the value of the parameter is determined at regular intervals.

3. A method according to claim 1, wherein the moist material is moved through the supply pipe towards the feeding unit, whereby a conveying capacity of the conveyor is regulated taking the parameter into account.

4. A method according to claim 1, wherein the value of the parameter is averaged over a defined period and the quantity of the moist material being deposited on the drying surface per unit of time by the feeding unit is regulated based on respective averaged parameters.

5. A method according to claim 1, wherein the parameter is determined with a non-contact microwave sensor.

6. A method according to claim 1, wherein regulation of the quantity of moist material being deposited on the drying surface per unit of time takes place based on at least one of a current drying capacity and additional characteristic values of the drying plant.

7. A method according to claim 1, wherein the feeding unit includes an extruder with a pelletization device for making pellets of moist material, whereby the pelletization device is operated taking the parameter into account.

8. A drying plant for drying moist material, the drying plant comprising:
   at least one drying surface to receive the moist material during drying;
   at least one feeding unit for depositing the moist material on the drying surface while the drying plant is operating;
   at least one supply pipe through which the moist material to be dried can be supplied to the feeding unit;
   at least one sensor arranged in at least one of the supply pipe and the feeding unit, the sensor measuring a value of a parameter that depends on a water content of the moist material passing by the sensor; and
   a control unit in communication with the sensor and the feeding unit, the control unit taking the parameter into account to regulate a quantity of the moist material being deposited on the drying surface by the feeding unit while the drying plant is operating only when the value of the parameter measured by the sensor changes by at least a minimum amount, the minimum amount being one of a first difference between the value sensed in the sensing step and a reference value in a defined period of time or a second difference between the value sensed in the sensing step and a specific minimum value.

9. A drying plant according to claim 8, wherein the device includes a conveyor for supplying the moist material to the feeding unit through the supply pipe while the drying plant is operating, the control unit regulating a conveying capacity of the conveyor taking the parameter into account.

10. A drying plant according to claim 9, wherein the conveyor includes a pump.

11. A drying plant according to claim 8, wherein the senses the parameter without making contact with the moist material.

* * * * *